US009591946B1

(12) United States Patent
Valdes

(10) Patent No.: US 9,591,946 B1
(45) Date of Patent: Mar. 14, 2017

(54) DEVICE FOR SKEWERING A KEBAB

(71) Applicant: Juan Valdes, Michigan City, IN (US)

(72) Inventor: Juan Valdes, Michigan City, IN (US)

(*) Notice: Subject to any disclaimer, the term of this patent is extended or adjusted under 35 U.S.C. 154(b) by 0 days.

(21) Appl. No.: 14/829,396

(22) Filed: Aug. 18, 2015

(51) Int. Cl.
*A47J 37/04* (2006.01)

(52) U.S. Cl.
CPC ..................... *A47J 37/04* (2013.01)

(58) Field of Classification Search
CPC ............ A47J 43/18; A47J 43/00; A22C 17/00
USPC .... 99/340, 419, 421 H, 421 P, 427; 426/518, 426/523
See application file for complete search history.

(56) References Cited

U.S. PATENT DOCUMENTS

| 2,136,658 | A |   | 11/1938 | Westberg et al. |   |
|---|---|---|---|---|---|
| 3,433,151 | A |   | 3/1969 | Farran et al. |   |
| 4,366,750 | A | * | 1/1983 | Brown | A47J 37/043 99/421 P |
| 4,483,241 | A |   | 11/1984 | Vaughn |   |
| 4,664,026 | A | * | 5/1987 | Milloy | A47J 37/0704 99/352 |
| 5,100,366 | A | * | 3/1992 | Castens | A47J 43/18 452/198 |
| 5,193,443 | A | * | 3/1993 | Carney | A47J 37/0786 211/125 |

* cited by examiner

*Primary Examiner* — Thien S Tran
(74) *Attorney, Agent, or Firm* — Stevenson IP, LLC

(57) ABSTRACT

A device for skewering a kebab including an enclosed substantially cylindrical casing. The casing includes a pair of ends including a right end and a left end, a cylindrical body having a first half hingedly attached to a second half, and a pair of slots including a right slot and a left slot. Each of the right end and the left end has a continuous outer edge and a middle portion disposed within the outer edge. An interior surface of the body proximal a right edge is disposed around the outer edge of the right end, and the interior surface of the body proximal a left edge is disposed around the outer edge of the left end. The right slot is disposed within the right end, and the left slot is disposed within the left end. A skewer is removably disposed within the casing through the pair of slots.

5 Claims, 3 Drawing Sheets

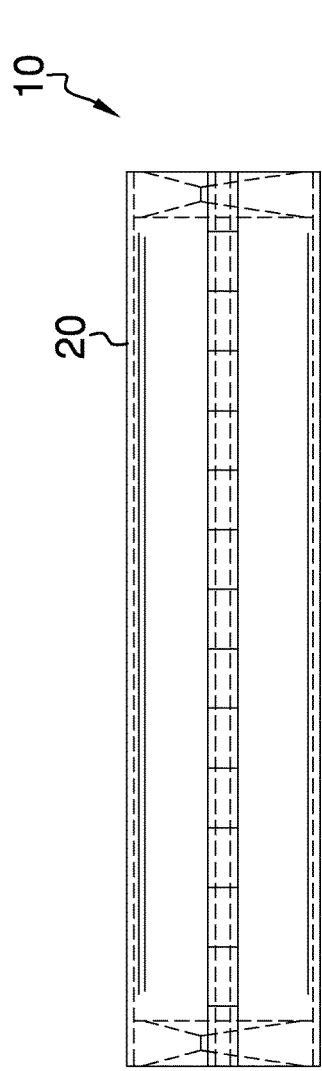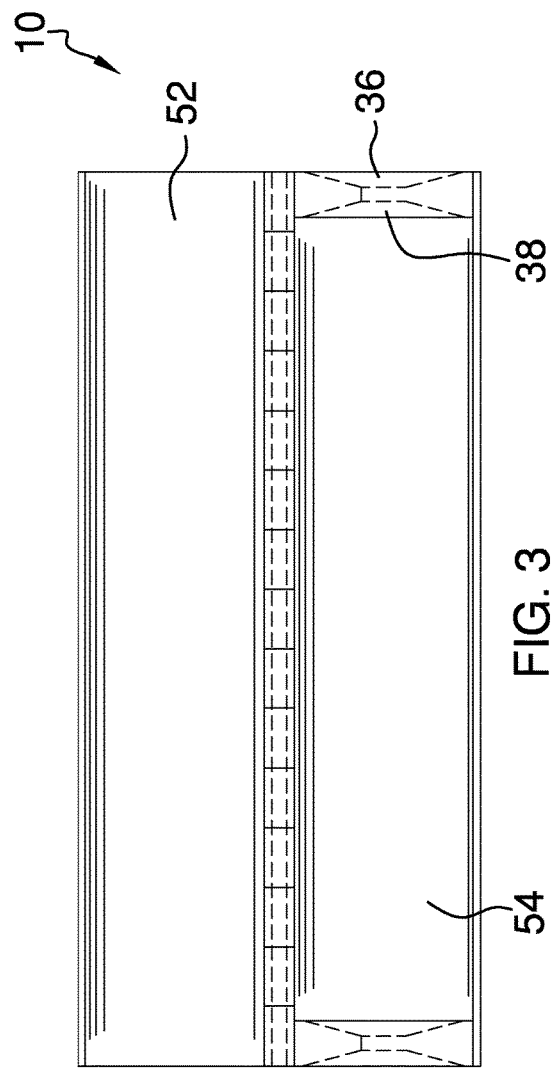

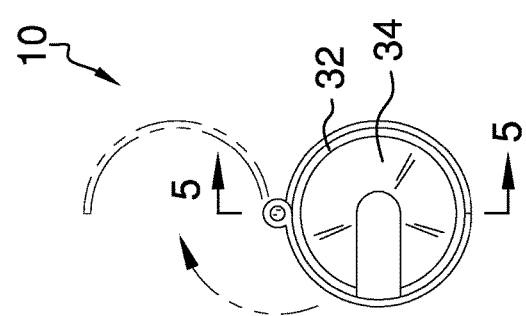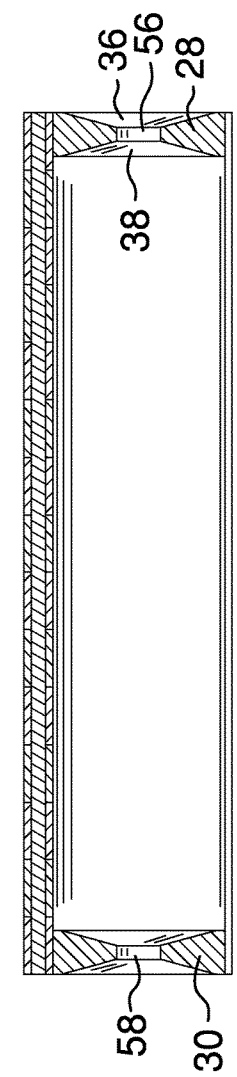

DEVICE FOR SKEWERING A KEBAB

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of skewering devices are known in the prior art. However, what ii has been needed is a device for skewering a kebab including an enclosed substantially cylindrical casing. The casing includes a pair of ends, a cylindrical body having a first half hingedly attached to a second half, and a pair of slots. Each of the right end and the left end has a continuous outer edge and a middle portion disposed within the outer edge. An interior surface of the body proximal a right edge is disposed around the outer edge of a right end of the pair of ends, and the interior surface of the body proximal a left edge is disposed around the outer edge of a left end of the pair of ends. The right slot is disposed within the right end, and the left slot is disposed within the left end. What has been further needed is for the body to have an open position and an alternate closed position, such that the casing is configured to enclose a plurality of cubes of food within the body in the closed position. Lastly, what has been needed is for a skewer to be removably disposed within the casing through the pair of slots. The device for skewering a kebab thus provides a way in which a user can more easily create a small hole through each of the plurality of food cubes within the casing, particularly if the skewer is constructed of stainless steel. A more traditional wooden skewer is then optionally inserted through each of the premade holes, reducing the possibility that the wooden skewer will splinter or break.

FIELD OF THE INVENTION

The present invention relates to skewering devices, and more particularly, to a device for skewering a kebab.

SUMMARY OF THE INVENTION

The general purpose of the present device for skewering a kebab, described subsequently in greater detail, is to provide a skewering device which has many novel features that result in a device for skewering a kebab which is not anticipated, rendered obvious, suggested, or even implied by prior art, either alone or in combination thereof.

To accomplish this, the present device for skewering a kebab includes an enclosed substantially cylindrical casing. A diameter of the casing and a length of the casing is optionally 1.5 inches and 7.5 inches, respectively. The casing further includes a pair of substantially cylindrical ends, an elongated cylindrical body, and a pair of slots. The ends include a right end and a left end. Each of the right end and the left end has a continuous outer edge and a middle portion disposed within the outer edge. The middle portion has a funnel-shaped external surface and a funnel-shaped internal surface. The outer edge has a front side and a back side. The body has an exterior surface, an interior surface, a right edge, and a left edge. The body includes a first half hingedly and continuously attached to a second half. The interior surface of the body proximal the right edge is disposed around the outer edge of the right end, and the interior surface of the body proximal the left edge is disposed around the outer edge of the left end. The pair of slots includes a right slot and a left slot. The right slot is continuously disposed within the right end from the outer edge to substantially a midpoint of the middle portion, and the left slot is continuously disposed within the left end from the outer edge to substantially a midpoint of the middle portion. Each of the right slot and the left slot is medially disposed underneath the first half of the body.

The body has an open position and an alternate closed position. The body is in the open position when the first half of the body is disposed atop the second half of the body. The body is in the closed position when the first half of the body is disposed around the pair of ends. A cylindrical skewer has a pointed first end and a handle disposed around a second end of the skewer. The skewer is removably disposed within the casing through the pair of slots. The casing is configured to enclose a plurality of cubes of food within the body in the closed position such that the skewer is removably insertable through each of the plurality of cubes of food when the skewer is disposed through the pair of slots. The casing and the skewer are optionally stainless steel.

Thus has been broadly outlined the more important features of the present device for skewering a kebab so that the detailed description thereof that follows may be better understood and in order that the present contribution to the art may be better appreciated.

BRIEF DESCRIPTION OF THE DRAWINGS

Figures

FIG. 2 is a front elevation view showing a body in a closed position.

FIG. 3 is a front elevation view showing the body in an open position.

FIG. 4 is a side elevation view.

FIG. 5 is a cross-sectional view taken along line 5-5 of FIG. 4.

DETAILED DESCRIPTION OF THE DRAWINGS

Figure 1:
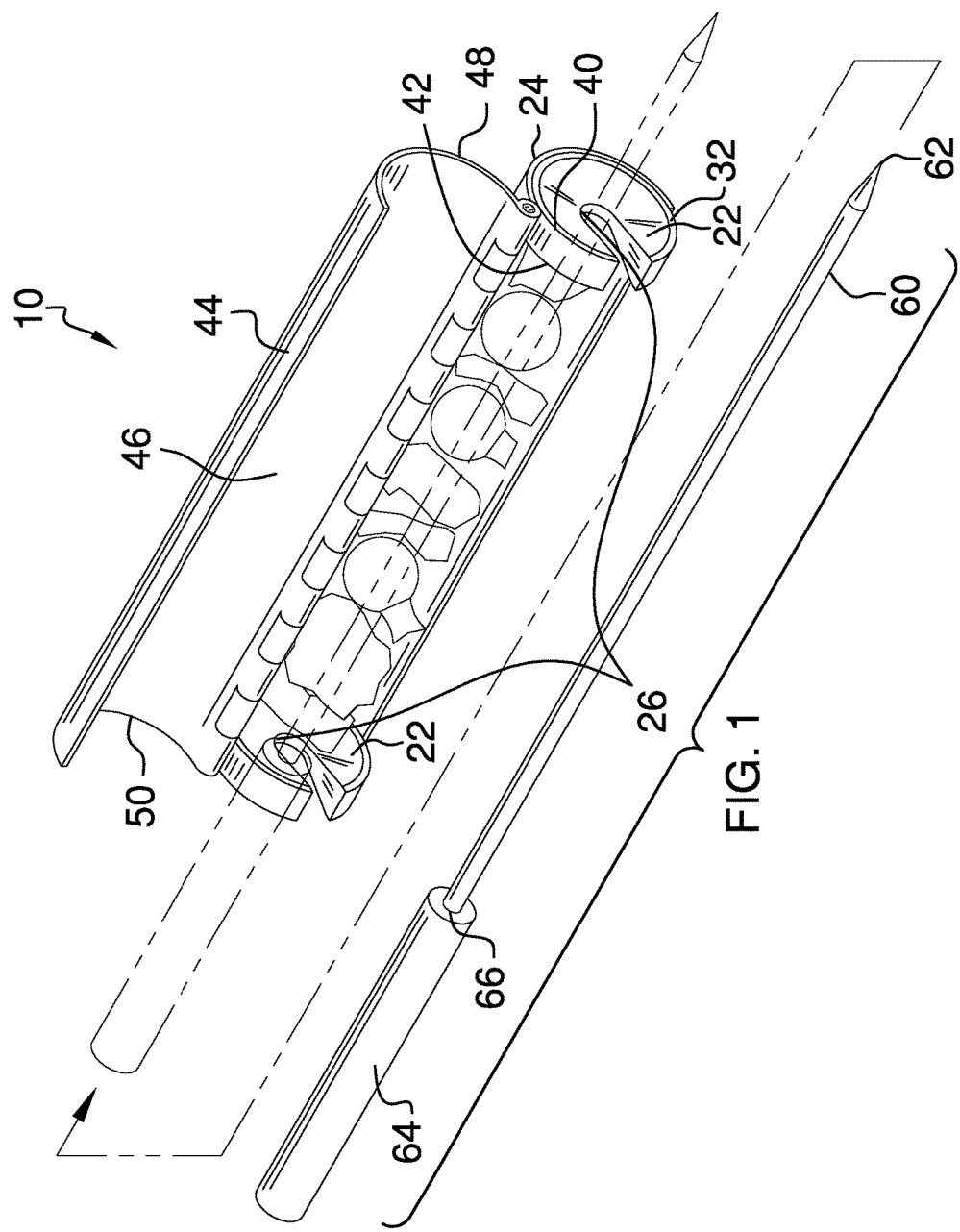
FIG. 1 is a front isometric view.

With reference now to the drawings, and in particular FIGS. 1 through 5 thereof, an example of the instant device for skewering a kebab employing the principles and concepts of the present device for skewering a kebab and generally designated by the reference number 10 will be described.

Referring to FIGS. 1 through 5 the present device for skewering a kebab 10 is illustrated. The device for skewering a kebab 10 includes an enclosed substantially cylindrical casing 20. The casing 20 further includes a pair of substantially cylindrical ends 22, an elongated cylindrical body 24, and a pair of slots 26. The ends 22 include a right end 28 and a left end 30. Each of the right end 28 and the left end 30 has a continuous outer edge 32 and a middle portion 34 disposed within the outer edge 32. The middle portion 34 has a circular concave external surface 36 and a circular concave internal surface 38. The outer edge 32 has a front side 40 and a back side 42. The body 24 has an exterior surface 44, an interior surface 46, a right edge 48, and a left edge 50. The body 24 includes a first half 52 hingedly and continuously attached to a second half 54. The interior surface 46 of the body 24 proximal the right edge 48 is disposed around the outer edge 32 of the right end 28, and the interior surface 46 of the body 24 proximal the left edge 50 is disposed around the outer edge 32 of the left end 30. The pair of slots 26 includes a right slot 56 and a left slot 58. The right slot 56 is continuously disposed within the right end 28 from the outer edge 32 to substantially a midpoint of the middle portion 34, and the left slot 58 is continuously disposed within the left end 30 from the outer edge 32 to substantially a midpoint of the middle portion 34. Each of the right slot 56 and the left slot 58 is medially disposed underneath the first half 52 of the body 24.

The body 24 has an open position and an alternate closed position. As best shown in FIGS. 1 and 3, the body 24 is in the open position when the first half 52 of the body 24 is disposed atop the second half 54 of the body 24. As best shown in FIG. 2, the body 24 is in the closed position when the first half 52 of the body 24 is disposed around the pair of ends 22. A cylindrical skewer 60 has a pointed first end 62 and a handle 64 disposed around a second end 66 of the skewer 60. As best shown in FIG. 1, the skewer 60 is removably disposed within the casing 20 through the pair of slots 26.

What is claimed is:

1. A device for skewering a kebab comprising:
    an enclosed substantially cylindrical casing further comprising:
        a pair of substantially cylindrical ends comprising a right end and a left end, each of the right end and the left end having a continuous outer edge and a middle portion disposed within the outer edge, the middle portion having a circular concave external surface and a circular concave internal surface, the outer edge having a front side and a back side;
        an elongated cylindrical body having an exterior surface, an interior surface, a right edge, and a left edge, the body comprising a first half hingedly and continuously attached to a second half, wherein the body interior surface proximal the right edge is disposed around the right end outer edge, and the body interior surface proximal the left edge is disposed around the left end outer edge;
        a pair of slots comprising a right slot and a left slot, wherein the right slot is continuously disposed within the right end from the outer edge to substantially a midpoint of the middle portion, and the left slot is continuously disposed within the left end from the outer edge to substantially a midpoint of the middle portion, wherein each of the right slot and the left slot is medially disposed underneath the body first half;
    wherein the body has an open position and an alternate closed position;
    wherein the body is in the open position when the body first half is disposed atop the body second half;
    wherein the body is in the closed position when the body first half is disposed around the pair of ends; and
    a cylindrical skewer having a pointed first end and a handle disposed around a second end of the skewer, wherein the skewer is removably disposed within the casing through the pair of slots;
    wherein the casing is configured to enclose a plurality of cubes of food within the body in the closed position such that the skewer is removably insertable through each of the plurality of cubes of food when the skewer is disposed through the pair of slots.

2. The device for skewering a kebab of claim 1 wherein the casing and the skewer are stainless steel.

3. The device for skewering a kebab of claim 1 wherein a diameter of the casing is 1.5 inches.

4. The device for skewering a kebab of claim 1 wherein a length of the casing is 7.5 inches.

5. A device for skewering a kebab comprising:
    an enclosed substantially cylindrical casing further comprising:
        a pair of substantially cylindrical ends comprising a right end and a left end, each of the right end and the left end having a continuous outer edge and a middle portion disposed within the outer edge, the middle portion having a circular concave external surface and a circular concave internal surface, the outer edge having a front side and a back side;
        an elongated cylindrical body having an exterior surface, an interior surface, a right edge, and a left edge, the body comprising a first half hingedly and continuously attached to a second half, wherein the body interior surface proximal the right edge is disposed around the right end outer edge, and the body interior surface proximal the left edge is disposed around the left end outer edge;
        a pair of slots comprising a right slot and a left slot, wherein the right slot is continuously disposed within the right end from the outer edge to substantially a midpoint of the middle portion, and the left slot is continuously disposed within the left end from the outer edge to substantially a midpoint of the middle portion, wherein each of the right slot and the left slot is medially disposed underneath the body first half;
    wherein a diameter of the casing is 1.5 inches;
    wherein a length of the casing is 7.5 inches;
    wherein the body has an open position and an alternate closed position;
    wherein the body is in the open position when the body first half is disposed atop the body second half;
    wherein the body is in the closed position when the body first half is disposed around the pair of ends; and
    a cylindrical skewer having a pointed first end and a handle disposed around a second end of the skewer, wherein the skewer is removably disposed within the casing through the pair of slots;
    wherein the casing is stainless steel;
    wherein the skewer is stainless steel;
    wherein the casing is configured to enclose a plurality of cubes of food within the body in the closed position such that the skewer is removably insertable through each of the plurality of cubes of food when the skewer is disposed through the pair of slots.

* * * * *